(12) United States Patent
Hashimoto et al.

(10) Patent No.: US 10,032,298 B2
(45) Date of Patent: Jul. 24, 2018

(54) IMAGE DISPLAY CONTROL APPARATUS AND IMAGE DISPLAY SYSTEM

(71) Applicant: AISIN SEIKI KABUSHIKI KAISHA, Kariya-shi, Aichi (JP)

(72) Inventors: Yoshikuni Hashimoto, Anjo (JP); Tamotsu Kameshima, Kariya (JP); Takayuki Higo, Nagoya (JP); Naoki Kajigai, Anjo (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 14/778,634

(22) PCT Filed: Mar. 17, 2014

(86) PCT No.: PCT/JP2014/057199
§ 371 (c)(1),
(2) Date: Sep. 21, 2015

(87) PCT Pub. No.: WO2014/156786
PCT Pub. Date: Oct. 2, 2014

(65) Prior Publication Data
US 2016/0042543 A1    Feb. 11, 2016

(30) Foreign Application Priority Data

Mar. 29, 2013 (JP) .................. 2013-074916

(51) Int. Cl.
*G09G 5/00* (2006.01)
*G06T 11/60* (2006.01)
(Continued)

(52) U.S. Cl.
CPC ............... *G06T 11/60* (2013.01); *B60R 1/00* (2013.01); *G06T 3/4038* (2013.01);
(Continued)

(58) Field of Classification Search
CPC ................. G09G 5/14; G09G 2340/10; G09G 2340/125; G06T 11/60; G06T 15/503
(Continued)

(56) References Cited

U.S. PATENT DOCUMENTS

| | | | |
|---|---|---|---|
| 2003/0108222 A1 | 6/2003 | Sato et al. | |
| 2005/0174429 A1* | 8/2005 | Yanai | B60R 1/00 348/148 |

(Continued)

FOREIGN PATENT DOCUMENTS

| | | | |
|---|---|---|---|
| CN | 101808236 A | 8/2010 | |
| CN | 101953163 A | 1/2011 | |

(Continued)

OTHER PUBLICATIONS

International Search Report for PCT/JP2014/057199 dated Jun. 3, 2014.

*Primary Examiner* — Ke Xiao
*Assistant Examiner* — Gordon Liu
(74) *Attorney, Agent, or Firm* — Sughrue Mion, PLLC

(57) ABSTRACT

An image display control apparatus according to an embodiment includes, for example, includes a region identification portion distinguishing between a first region corresponding to a window in a vehicle inside image and a second region in the vehicle inside image excluding the first region, an image generation portion generating an image at least for a display range displayed at a display device, the image including a composite image where the vehicle inside image at the second region and a vehicle outside image conforming to the second region are superimposed on each other with a specified ratio and a vehicle outside image at the first region, a display range decision portion configured to change the display range, and a display control portion controlling the display device so that the image generated by the image (Continued)

generation portion is displayed at the display range which is decided by the display range decision portion.

14 Claims, 14 Drawing Sheets

(51) Int. Cl.
*B60R 1/00* (2006.01)
*G06T 3/40* (2006.01)
*H04N 5/232* (2006.01)
*H04N 5/265* (2006.01)
*H04N 7/18* (2006.01)

(52) U.S. Cl.
CPC ..... *H04N 5/23229* (2013.01); *H04N 5/23293* (2013.01); *H04N 5/265* (2013.01); *B60R 2300/304* (2013.01); *B60R 2300/802* (2013.01); *H04N 7/18* (2013.01)

(58) Field of Classification Search
USPC ........................................................ 345/629
See application file for complete search history.

(56) References Cited

U.S. PATENT DOCUMENTS

| | | |
|---|---|---|
| 2008/0231703 A1 | 9/2008 | Nagata et al. |
| 2009/0016073 A1* | 1/2009 | Higgins-Luthman .. B60Q 1/085 362/465 |
| 2009/0168185 A1* | 7/2009 | Augustine ................. B60J 3/04 359/613 |
| 2010/0201818 A1 | 8/2010 | Imanishi et al. |
| 2011/0043632 A1 | 2/2011 | Satoh |
| 2012/0113261 A1* | 5/2012 | Satoh ........................ B60R 1/00 348/148 |

FOREIGN PATENT DOCUMENTS

| | | |
|---|---|---|
| CN | 102474596 A | 5/2012 |
| JP | 2003-196645 A | 7/2003 |
| JP | 2005-223524 A | 8/2005 |
| JP | 2010-109684 A | 5/2010 |
| JP | 2010-184607 A | 8/2010 |
| JP | 2011-035816 A | 2/2011 |
| JP | 2011-215887 A | 10/2011 |

* cited by examiner

F I G. 18
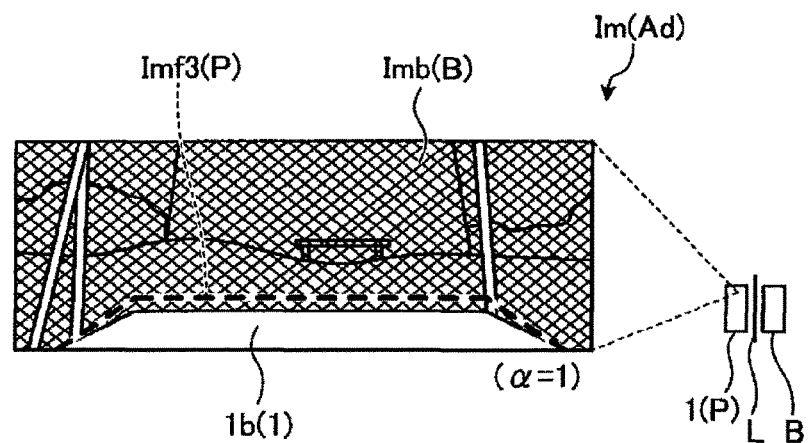

IMAGE DISPLAY CONTROL APPARATUS AND IMAGE DISPLAY SYSTEM

CROSS REFERENCE TO RELATED APPLICATIONS

This application is a National Stage of International Application No. PCT/JP2014/057199 filed Mar. 17, 2014, claiming priority based on Japanese Patent Application No. 2013-074916 filed Mar. 29, 2013, the contents of all of which are incorporated herein by reference in their entirety.

TECHNICAL FIELD

An embodiment of the present invention relates to an image display control apparatus and an image display system.

BACKGROUND ART

Conventionally, an image processing apparatus for a vehicle generating and displaying an image where a pillar is transparent when viewed from an inside of a vehicle is known.

DOCUMENT OF PRIOR ART

Patent Document

Patent document 1: JP2003-196645A

OVERVIEW OF INVENTION

Problem to be Solved by Invention

In the aforementioned type of apparatus, as an example, it is desirable that a display mode of an image where a vehicle body is transparent is appropriately changed.

Means for Solving Problem

An image display control apparatus according to an embodiment of the present invention, as an example, includes a region identification portion distinguishing between a first region corresponding to a window in a vehicle inside image and a second region in the vehicle inside image excluding the first region, an image generation portion generating an image at least for a display range displayed at a display device, the image including a composite image where the vehicle inside image at the second region and a vehicle outside image conforming to the second region are superimposed on each other with a specified ratio and a vehicle outside image at the first region, a display range decision portion configured to change the display range, and a display control portion controlling the display device so that the image generated by the image generation portion is displayed at the display range which is decided by the display range decision portion. Accordingly, in the present embodiment, as an example, a display mode of the image is changeable.

In the aforementioned image display control apparatus, as an example, the display range decision portion changes the display range based on a signal obtained by a driving operation of a vehicle. Accordingly, as an example, the display mode of the image is changeable on the basis of the driving operation of an operator.

In the aforementioned image display control apparatus, as an example, the display range decision portion changes the display range depending on a steering angle detected by a steering angle detection portion that detects the steering angle. Accordingly, as an example, the display mode of the image depending on the steering angle is obtainable.

In the aforementioned image display control apparatus, as an example, the display range decision portion changes the display range depending on a vehicle position acquired by a vehicle position acquisition portion that acquires the vehicle position. Accordingly, as an example, the display mode of the image depending on the vehicle position is obtainable.

In the aforementioned image display control apparatus, as an example, the display range decision portion changes the display range depending on a position of an object detected by an object detection portion that detects the object at a vehicle exterior. Accordingly, as an example, the display mode of the image depending on the position of the object is obtainable.

The aforementioned image display control apparatus, as an example, includes a ratio change portion changing a ratio. Accordingly, as an example, the display mode of the image is further changeable.

In the aforementioned image display control apparatus, as an example, the ratio change portion changes the ratio based on a signal obtained by a driving operation of a vehicle. Accordingly, as an example, the display mode of the image is changeable on the basis of the driving operation of an operator.

In the aforementioned image display control apparatus, as an example, the ratio change portion changes the ratio depending on a steering angle detected by a steering angle detection portion that detects the steering angle. Accordingly, as an example, the display mode of the image depending on the steering angle is obtainable.

In the aforementioned image display control apparatus, as an example, the ratio change portion changes the ratio depending on a vehicle position acquired by a vehicle position acquisition portion that acquires the vehicle position. Accordingly, as an example, the display mode of the image depending on the vehicle position is obtainable.

In the aforementioned image display control apparatus, as an example, the ratio change portion changes the ratio depending on a position of an object detected by an object detection portion that detects an object at the vehicle exterior. Accordingly, as an example, the display mode of the image depending on the position of the object is obtainable.

The aforementioned image display control apparatus, as an example, includes an object position determination portion determining whether an object identified as an image within a window frame in the vehicle inside image is positioned at a vehicle interior or a vehicle exterior. The region identification portion causes the image within the window frame of the object which is determined as being positioned at the vehicle interior by the object position determination portion to be included in the second region and causes the image of the object determined as being positioned at the vehicle exterior by the object position determination portion to be included in the first region. Accordingly, as an example, the image may be displayed further accurately.

An image display system according to the embodiment of the present invention, as an example, includes the aforementioned image display control apparatus, a display device controlled by the image display control apparatus, a first imaging portion imaging a vehicle inside image, and a second imaging portion imaging a vehicle outside image. Accordingly, as an example, the display mode of the image is changeable.

The aforementioned image display control apparatus, as an example, includes a region identification portion distinguishing between a first region corresponding to a window in a vehicle inside image and a second region in the vehicle inside image excluding the first region, an image generation portion generating a composite image where a vehicle outside image is superimposed on the vehicle inside image at the second region with a specified ratio at least for a display range displayed at a display device, a display range decision portion configured to change the display range, and a display control portion controlling the display device so that the image generated by the image generation portion is displayed at the display range which is decided by the display range decision portion. Accordingly, in the present embodiment, as an example, the display mode of the image is changeable.

BRIEF DESCRIPTION OF DRAWINGS

FIG. 18 is a schematic view illustrating the position of the vehicle at the time of parking and the example of the image (output image) displayed at the display device of the image display system at the aforementioned position, and is a diagram in a state where the vehicle is closer to the target parking position than the state in FIG. 17.

MODE FOR CARRYING OUT THE INVENTION

Embodiment

Figure 1:
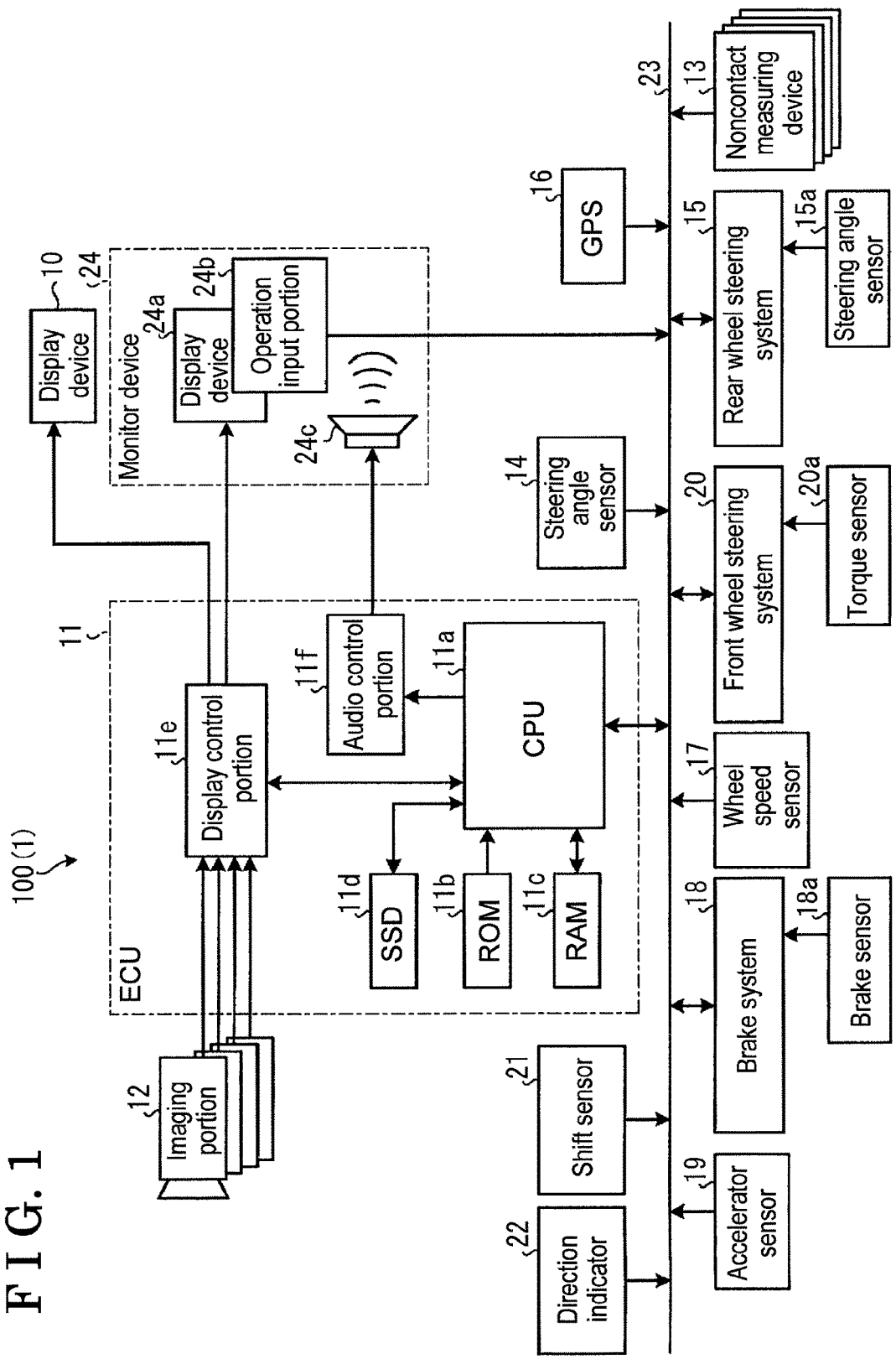
FIG. 1 is a schematic structural view of an example of an image display system according to an embodiment.

An embodiment and alternative examples as below include the similar components to one another. Thus, in the following, the similar components bear the common reference numerals. In addition, duplicated explanation is omitted.

In the present embodiment, as an example, an image display system 100 mounted at a vehicle 1 includes an ECU 11 (electronic control unit, control portion, image display control apparatus) controlling an image displayed at a display device 10 as illustrated in FIG. 1. The display device 10 is, for example, a display panel provided at an upper front portion of a vehicle interior (inside a cabin) as a replacement for a room mirror (rearview mirror) for rearward recognition. In this case, a left-right reverse image from an image captured by imaging portions 12 provided at the vehicle interior and a vehicle exterior (outside the cabin) is displayed at the display device 10. In addition, in this case, a half mirror may be provided at a surface side (at a rear side in a vehicle front-rear direction) of a display screen (not illustrated) of the display device 10. At this time, however, the display device 10 is not limited to the above and may be an apparatus projecting the image onto a windshield or a screen at the vehicle interior, for example, or may be a display panel provided at a dashboard (cockpit module, instrument panel, fascia, not illustrated) at a front portion of the vehicle interior or a center console, for example. The display device 10 may be configured, as an example, as a LCD (liquid crystal display), an OELD (organic electroluminescent display), a projector apparatus or the like.

Figure 2:
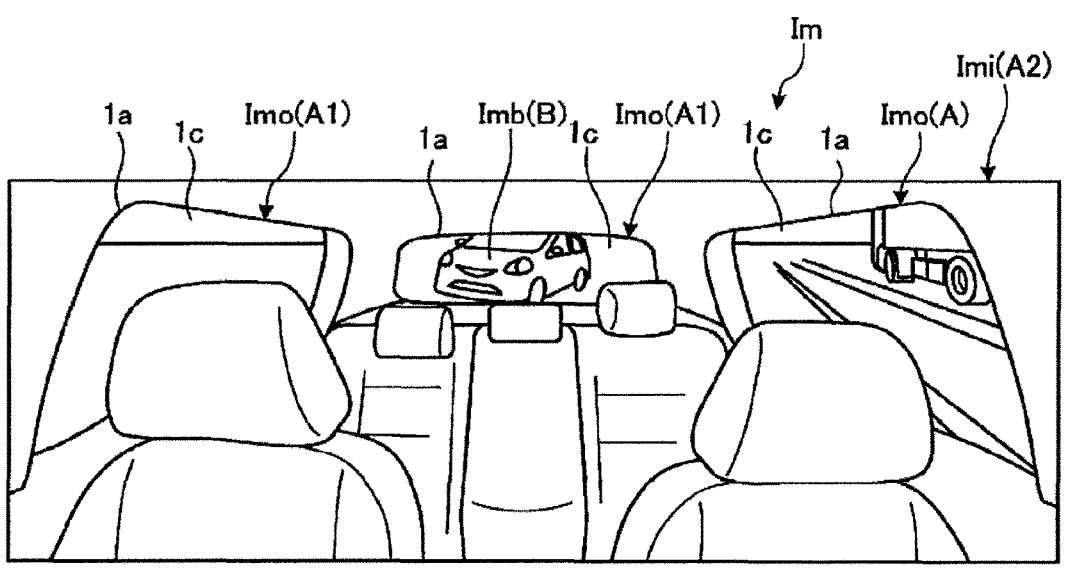
FIG. 2 is an example of an image (output image, transmission rate=0) displayed at a display device of the image display system according to the embodiment.
Figure 3:
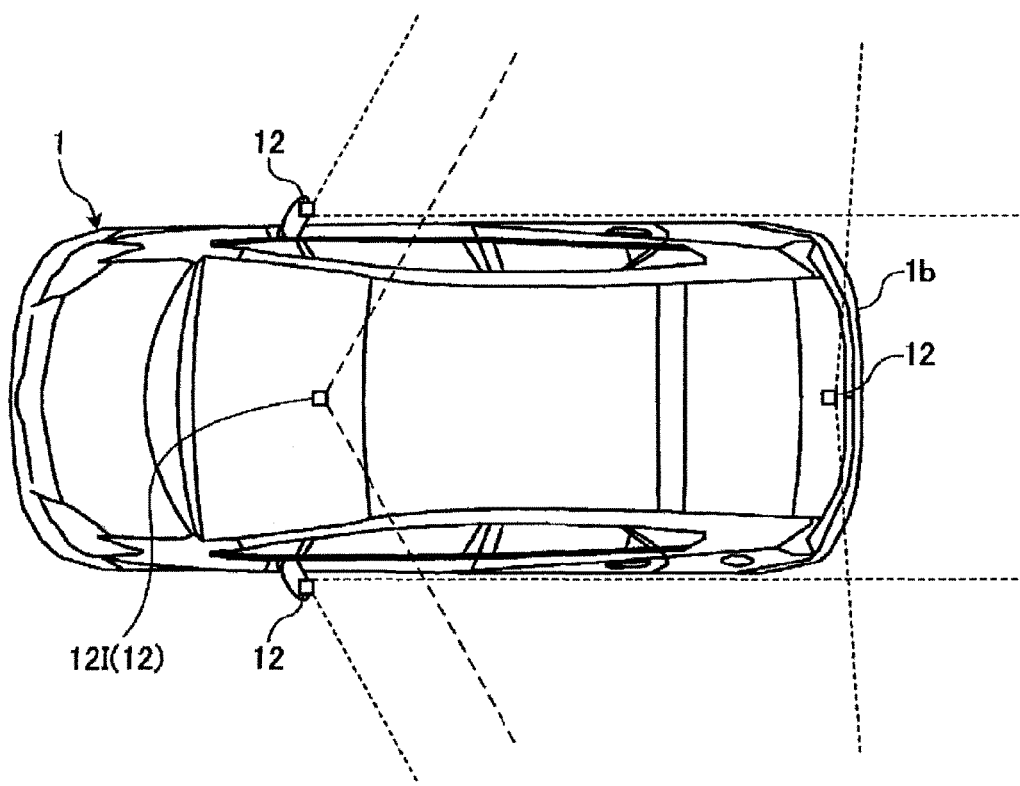
FIG. 3 is a plan view of an example of an imaging range by an imaging portion of the image display system according to the embodiment.
Figure 5:
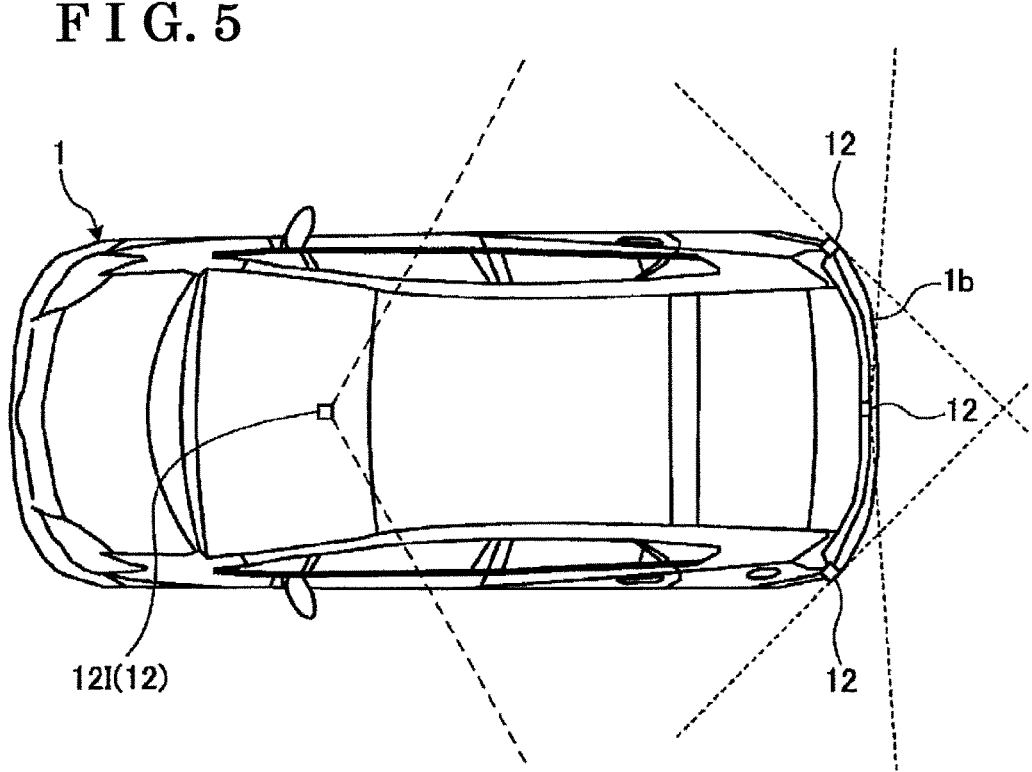
FIG. 5 is a plan view of another example of the imaging range by the imaging portion of the image display system according to the embodiment.

In the present embodiment, as an example, the display device 10 may display the image where a rear side is viewed from a relatively front position of the vehicle interior. In the image display system 100 according to the present embodiment, as illustrated in FIG. 2, the image (output image Im) displayed at the display device 10 includes a vehicle inside image Imi (image at the inside of the vehicle including a passenger, luggage, goods, and the like in addition to a pillar, a door, a seat, a trim and a roof, for example) and a vehicle outside image Imo indicating a scene at the outside of the vehicle at a portion corresponding to a window 1c (within a window frame 1a). As illustrated in FIGS. 3 and 5, the vehicle inside image Imi is acquired by an imaging portion 12I (12) provided at the vehicle interior. The imaging portion 12 is, for example, a digital camera incorporating an imaging element such as a CCD (charge coupled device), a CIS (CMOS image sensor) and the like. The imaging portion 12 may output image data (moving image data, frame data) at a predetermined frame rate. In the present embodiment, as an example, a relatively wide range at the vehicle interior is captured by the imaging portion 12I (12) at the vehicle interior so that the vehicle inside image Imi for each position within the relatively wide range at the vehicle interior may be displayed at the display device 10. One or plural imaging portion(s) 12I (12) may be provided at the vehicle interior. As an example, the imaging portion 12I (12) at the vehicle interior is disposed at a front portion of the vehicle interior so as to be provided in the vicinity of the display device 10 or integrally with the display device 10. In a case where the plural imaging portions 12 are provided at the vehicle interior, the ECU 11 (control portion) combines the images acquired by the plural imaging portions 12.

Figure 4:
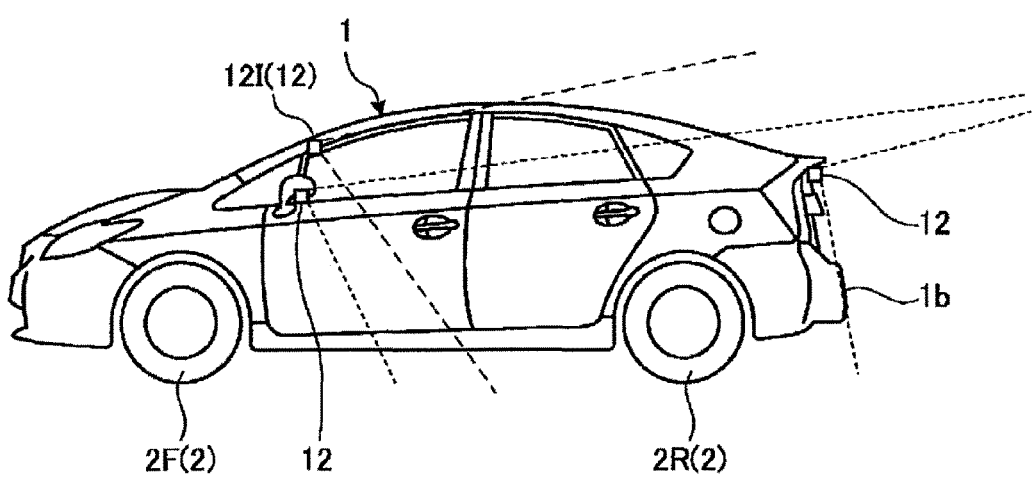
FIG. 4 is a side view of the example of the imaging range by the imaging portion of the image display system according to the embodiment.
Figure 6:
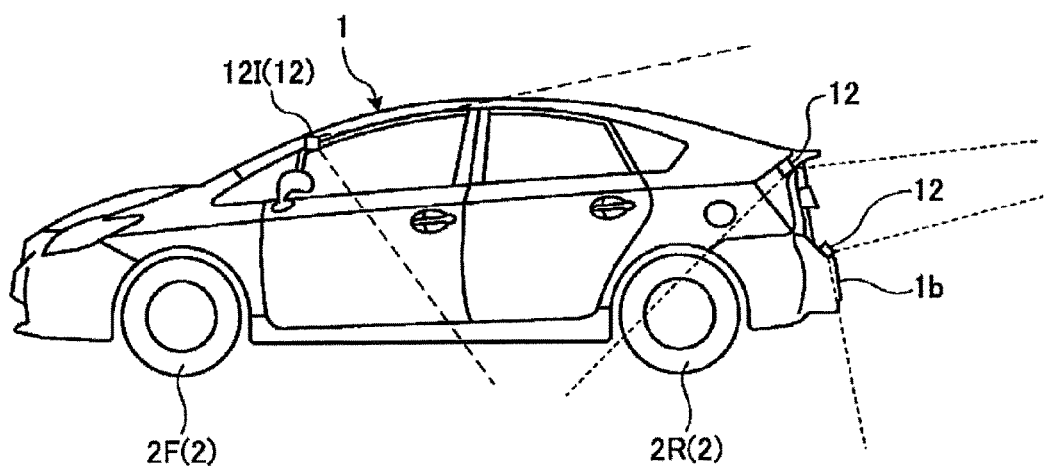
FIG. 6 is a side view of another example of the imaging range by the imaging portion of the image display system according to the embodiment.

The vehicle outside image Imo is acquired by the plural imaging portions 12 at the vehicle exterior. The ECU 11 combines the images acquired by the plural imaging portions 12 by a known technique to thereby obtain the continuous vehicle outside image Imo (panorama image, refer to FIG. 10). In the present embodiment, as an example, the plural imaging portions 12 at the vehicle exterior capture a relatively wide range at a rear side of the vehicle 1 so that the vehicle outside image Imo for each position within the relatively wide range may be displayed at the display device 10. In the example illustrated in FIG. 3 or 4, the imaging portions 12 at the vehicle exterior are provided at opposed side portions (left and right door mirrors, as an example) of the vehicle 1 (vehicle body) and at a rear end portion 1b of the vehicle 1, respectively. In the example illustrated in FIG. 5 or 6, the imaging portions 12 at the vehicle exterior are provided at opposed side portions (relatively upper side of corner portions at the rear side of the vehicle 1, as an example) and at the rear end portion 1b of the vehicle 1, respectively. In addition, respective imaging ranges of the imaging portions 12 may be differentiated up and down.

Figure 7:
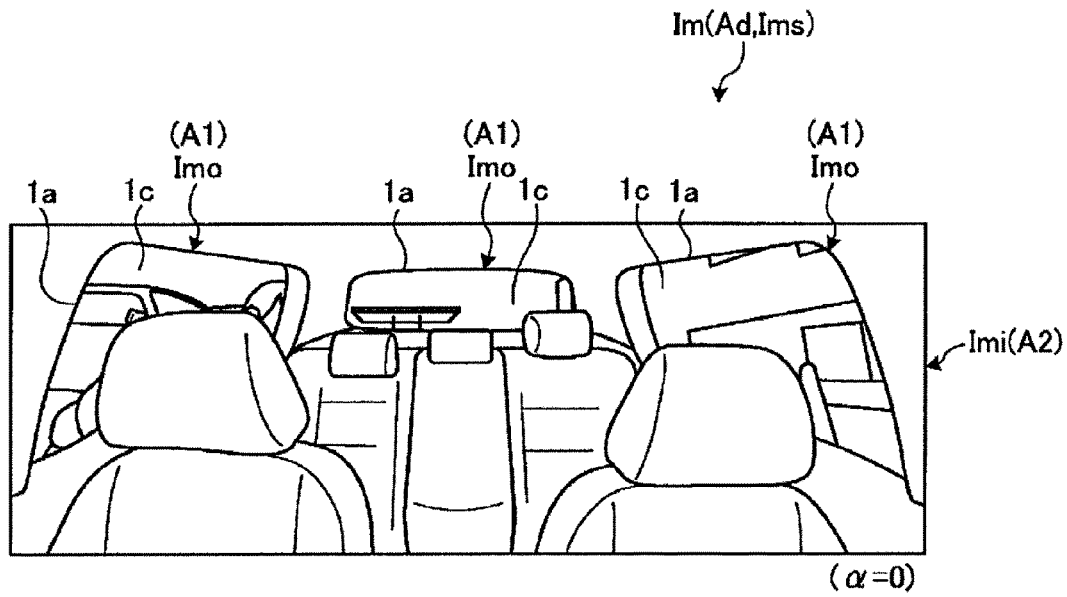
FIG. 7 is an example of the image (output image) displayed at the display device of the image display system according to the embodiment and is a diagram in a state where the transmission rate is 0.
Figure 8:
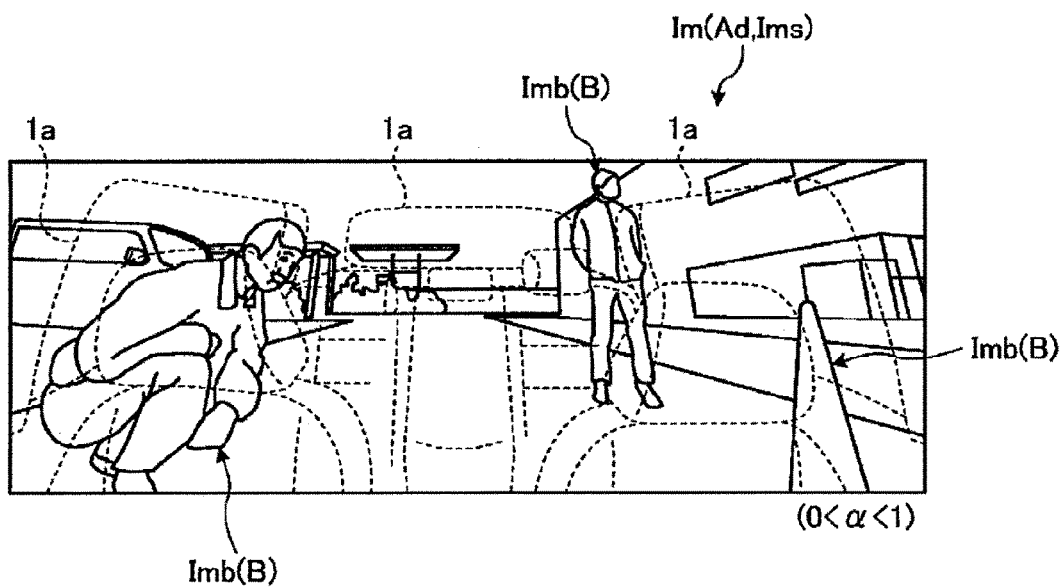
FIG. 8 is the example of the image (output image) displayed at the display device of the image display system according to the embodiment and is a diagram in a state where the transmission rate is greater than 0 and smaller than 1.
Figure 9:
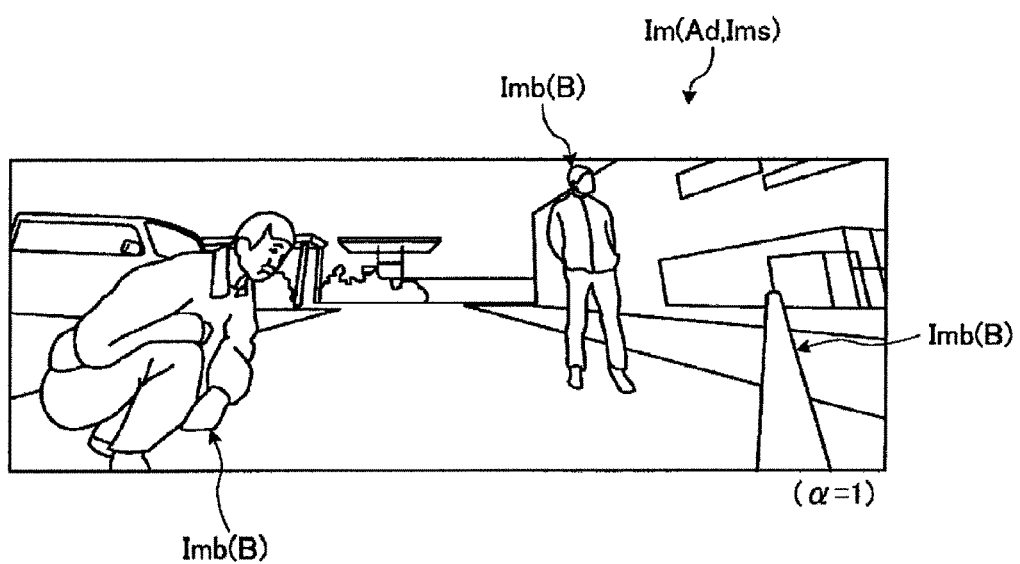
FIG. 9 is the example of the image (output image) displayed at the display device of the image display system according to the embodiment and is a diagram in a state where the transmission rate is 1.

In the present embodiment, as an example, the ECU 11 superimposes (combines) the vehicle inside image Imi and the vehicle outside image Imo to generate a composite image Ims (see FIG. 8) where a scene at the vehicle exterior is visible by passing through configurations of the vehicle interior (a pillar, a door, a seat, a trim, a roof, a passenger, luggage, goods and the like). In addition, as illustrated in FIGS. 7 to 9, the ECU 11 is capable of generating the composite image Ims in a manner that a transmission rate α (ratio) is differentiated. In FIG. 7, the composite image Ims with (α=0) (=vehicle inside image Imi) is illustrated. In FIG. 8, the composite image Ims with (0<α<1) is illustrated. In FIG. 9, the composite image Ims with (α=1) (=vehicle outside image Imo) is illustrated. In a relatively simple example, in a case where a luminance of the vehicle inside image Imi is x1, a luminance of the vehicle outside image Imo is x2, and the transmission rate is α (0≤α≤1), for each point in a state where the vehicle inside image Imi and the vehicle outside image Imo are adjusted in position, a luminance x of the composite image Ims superimposed at the aforementioned each point may satisfy x=(1−α)×x1+α×x2). As clearly understood from FIGS. 7 to 9, the aforementioned image composition is performed on a region except for the window 1c (region where a structure or an object, for example, of the vehicle interior is present) and is not performed on a region corresponding to the window 1c (region where a structure or an object, for example, of the vehicle interior is not present and a scene of the vehicle exterior is visible through the window 1c) (only the vehicle outside image Imo serves as the output image Im). The vehicle outside image Imo includes a continuous configuration at both the inside and the outside of the window 1c, however, the luminance of the vehicle outside image Imo may differ between the inside and the outside of the window 1c. The transmission rate α may be specified to any value.

Figure 10:
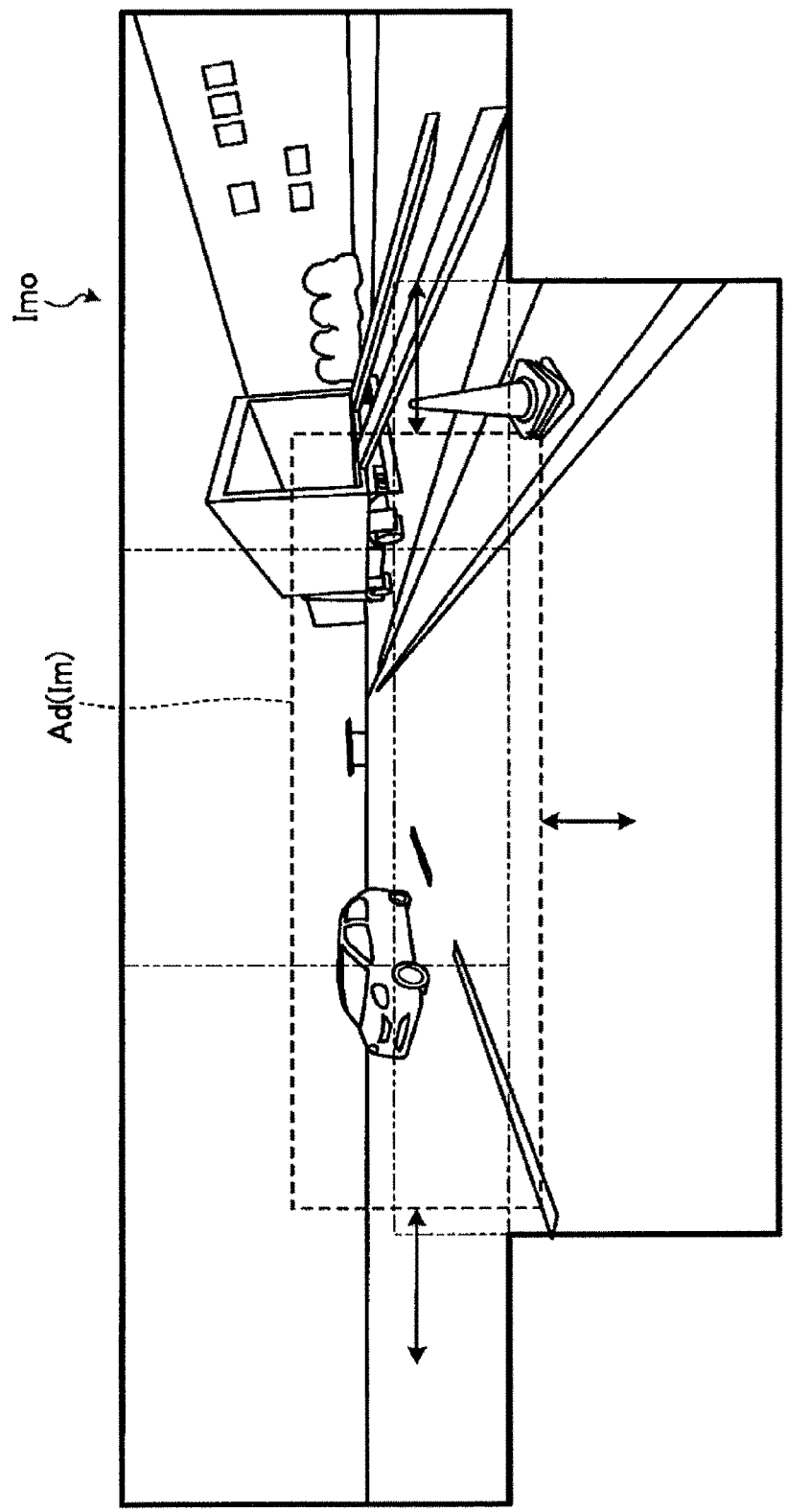
FIG. 10 is an explanatory view illustrating an example of a whole area and a display range of a vehicle outside image obtained by the image display system according to the embodiment.

Further, in the present embodiment, as an example, the ECU 11 may change a display range Ad in each of the vehicle inside image Imi and the vehicle outside image Imo. As an example, as illustrated in FIG. 10, the ECU 11 decides (moves) the display range Ad from the vehicle outside image Imo including a relatively wide range acquired from the imaging portions 12. The display range is also changeable for the vehicle inside image Imi.

In the present embodiment, as an example, the ECU 11 may change the transmission rate α or the display range Ad depending on a state of the vehicle 1. The ECU 11 may utilize detection results of various sensors as a trigger (signal, data) for changing the transmission rate cc or the display range Ad. Specifically, for example, the ECU 11 may change the transmission rate α or the display range Ad depending on detection results, signals and data acquired from a noncontact measuring device 13, a steering angle sensor 14 (for front wheels), a steering angle sensor 15a of a rear wheel steering system 15, a GPS 16 (global positioning system), a wheel speed sensor 17, a brake sensor 18a of a brake system 18, an accelerator sensor 19, a torque sensor 20a of a front wheel steering system 20, a shift sensor 21, a direction indicator 22 and the like illustrated in FIG. 1, instruction signals (control signal, switch signal, operation signal, input signal, data) of an operation input portion 24b (monitor device 24) and the like, a detection result of an object detection portion 112 (see FIG. 11), and a position of the vehicle 1 acquired by a vehicle position acquisition portion 115 (see FIG. 11), for example. As illustrated in FIG. 1, electric components included in the image display system 100 (i.e., the noncontact measuring device 13, the steering angle sensor 14, the steering angle sensor 15a, the GPS 16, the wheel speed sensor 17, the brake sensor 18a, the accelerator sensor 19, the torque sensor 20a, the shift sensor 21, the direction indicator 22, the operation input portion 24b, and the like) are electrically connectable via an in-vehicle network 23 (for example, CAN (controller area network)) as an example. Each of the electric components may be electrically connected via other than CAN.

The noncontact measuring device 13 (distance surveying portion, object detection device) is, for example, a sonar (sonar sensor, ultrasonic detector) that discharges an ultrasonic wave or an electric wave to capture a reflected wave thereof or a radar, for example. The ECU 11 may determine whether or not an object B (obstacle, see FIG. 15) is positioned in surroundings of the vehicle 1 or measure a distance from the object B. That is, the noncontact measuring device 13 is an example of an object detection portion.

The steering angle sensor 14 is a sensor that detects a steering amount (rotation angle) of a steering portion (steering wheel as an example, not illustrated) and is configured using a Hall element, for example. The steering angle sensor 15*a* is a sensor detecting a steering amount (rotation angle) of a rear wheel 2R (see FIG. 4) and is configured using a Hall element, for example.

The wheel speed sensor 17 is a sensor detecting a rotation amount or the number of rotations per unit time of a wheel 2 (see FIG. 4, front wheel 2F or rear wheel 2R) and is configured using a Hall element, for example. The ECU 11 may calculate a moving amount of the vehicle 1, for example, based on data acquired from the wheel speed sensor 17. The wheel speed sensor 17 may be provided at the brake system 18.

The brake system 18 is an ABS (anti-lock brake system) restraining a lock of a brake, a skid prevention system (ESC: electronic stability control) restraining a skid of the vehicle 1 when the vehicle 1 turns a corner, an electric brake system enhancing a brake force (performing a brake assist), a BBW (brake by wire) or the like. The brake system 18 applies a braking force to the wheel 2 (vehicle 1) via an actuator (not illustrated). The brake sensor 18*a* is a sensor detecting an operation amount of a brake pedal.

The accelerator sensor 19 is a sensor detecting an operation amount of an accelerator pedal. The torque sensor 20*a* detects torque applied by the driver to the steering portion. The shift sensor 21 is a sensor (switch) detecting a position of a movable portion (a lever, an arm, a button and the like, not illustrated) of a transmission operating portion and is configured using a displacement sensor, for example. Configurations, layouts, electric connection methods and the like of the aforementioned various sensors and actuators are examples and may be variously specified (changed). The direction indicator 22 outputs a signal instructing a light for direction indication to turn on (blink).

At the vehicle interior, a display device 24*a* different from the display device 10 and an audio output device 24*c* are provided. The display device 24*a* is a LCD or an OELD, for example. The audio output device 24*c* is a speaker, for example. The display device 24*a* is covered by the clear operation input portion 24*b* (for example, touch panel and the like). The passenger and the like may visually confirm the projected image (image) on a display screen of the display device 24*a* via the operation input portion 24*b*. The passenger and the like may perform an operation input (instruction input) by operating the operation input portion 24*b*, i.e., touching, pressing or moving the operation input portion 24*b* with one's hand and fingers, for example, at a position corresponding to the projected image (image) displayed on the display screen of the display device 24*a*. The display device 24*a*, the operation input portion 24*b*, the audio output device 24*c* and the like are provided at the monitor device 24 positioned at a center portion of a dashboard in a vehicle width direction (left-right direction). The monitor device 24 may include an operation input portion (not illustrated) such as a switch, a dial, a joy-stick and a pressing button, for example. The monitor device 24 may be shared by a navigation system and an audio system. The same image may be displayed at the display device 24*a* of the monitor device 24 as the display device 10.

The ECU 11 includes, as an example, a CPU 11*a* (central processing unit), a ROM 11*b* (read only memory), a RAM 11*c* (random access memory), a SSD 11*d* (solid state drive, flush memory), a display control portion 11*e*, an audio control portion 11*f*, and the like. The CPU 11*a* may perform various calculations. The CPU 11*a* may read out program stored (installed) at a nonvolatile memory device such as the ROM 11*b* and the SSD 11*d*, for example, and perform a calculation processing based on the aforementioned program. The RAM 11*c* tentatively stores various data used for the calculations at the CPU 11*a*. The SSD 11*d* is a rewritable nonvolatile memory portion that is able to store data even in a case where a power source of the ECU 11 is turned off. The display control portion 11*e* mainly performs, within the calculation processing at the ECU 11, an image processing using the image data obtained at the imaging portions 12 and an image processing (composition and the like, as an example) of the image data displayed at the display devices 10 and 24*a*. The audio control portion 11*f* mainly performs a processing of audio data output at the audio output device 24*c* within the calculation processing at the ECU 11. The CPU 11*a*, the ROM 11*b*, the RAM 11*c* and the like may be integrated within the same package. The ECU 11 may be configured to include other logic operation processor such as a DSP (digital signal processor) or a logic circuit, for example, than the CPU 11*a*. In addition, instead of the SSD 11*d*, a HDD (hard disk drive) may be provided. Further, the SSD 11*d* or the HDD may be provided separately from the ECU 11.

In the present embodiment, as an example, the display device 10 may display the output image Im corresponding to (similar to, adopted to, matching or positioned to) a map of the room mirror by the image processing of the ECU 11. In this case, a function (conversion equation, conversion matrix and the like) for performing a coordinate conversion from the vehicle outside image Imo or the vehicle inside image Imi (including the image where the plural images are combined) into the output image Im corresponding to the map of the room mirror, a coefficient, a constant, data and the like are obtainable by practically acquiring positions of plural markers which are practically arranged at the vehicle exterior or the vehicle interior within the map of the room mirror (by performing a calibration by imaging) or by performing a geometric calculation, for example.

Figure 11:
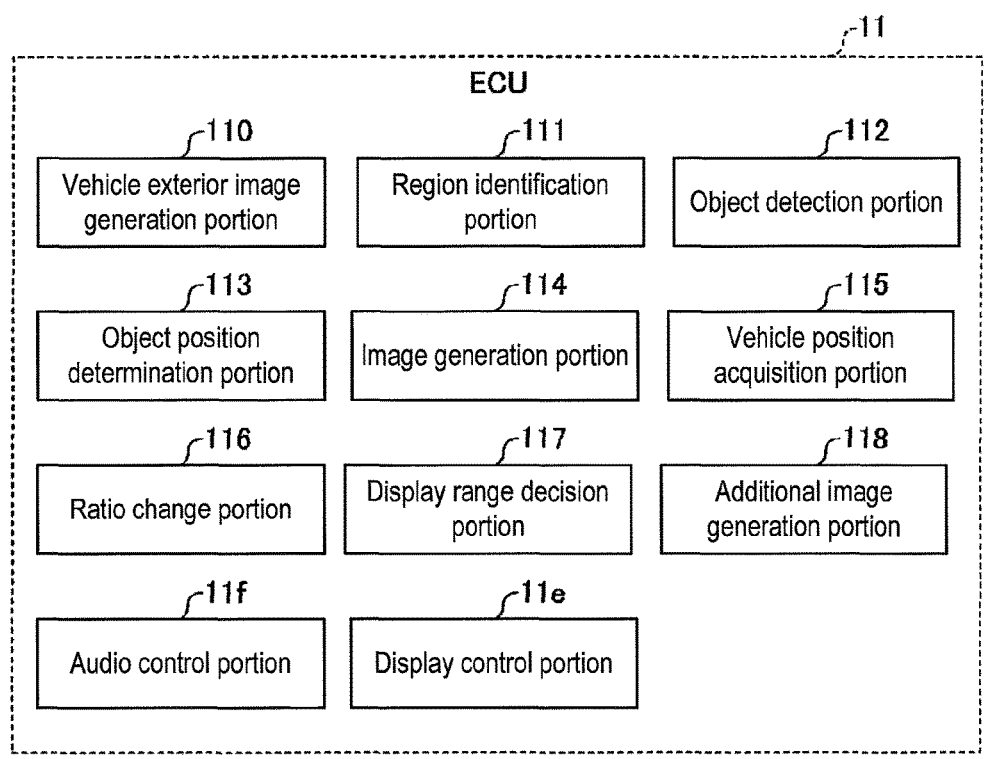
FIG. 11 is an example of a block diagram of a functional block of an ECU included in the image display system according to the embodiment.

In the present embodiment, as an example, the ECU 11 functions (operates) as at least a portion of the image display control apparatus in cooperation between hardware and software (program). That is, in the present embodiment, as an example, the ECU 11 functions (operates) as a vehicle outside image generation portion 110, a region identification portion 111, the object detection portion 112, an object position determination portion 113, an image generation portion 114, the vehicle position acquisition portion 115, a ratio change portion 116, a display range decision portion 117, an additional image generation portion 118 and the like as illustrated in FIG. 11, in addition to the display control portion 11*e* (see FIG. 1) and the audio control portion 11*f* (see FIG. 1). Here, the program may include, as an example, a module corresponding to each block illustrated in FIG. 11. The image processing may be performed at the CPU 11*a* besides the display control portion 11*e*.

The vehicle outside image generation portion 110 generates the continuous vehicle outside image Imo (panorama image) by connecting the plural (as an example, three in the present embodiment) images captured by the imaging portions 12 at the vehicle exterior by overlapping boundary portions of the images, as an example. In this case, the vehicle outside image generation portion 110 generates the vehicle outside image Imo which is visually adjusted in position relative to the vehicle inside image Imi, i.e., which is approximated to a line of sight from the imaging portion 12 at the vehicle interior by performing the coordinate conversion of the vehicle outside image Imo, for example. As for the position adjustment, the coordinate of the vehicle outside image Imo obtained from the imaging portion 12 is converted to the coordinate corresponding to the vehicle inside image Imi based on experimental results acquired beforehand, for example. In addition, a size and the like of the image Imb of the object B in the vehicle outside image Imo may be corrected using a measurement result of a distance to the object B by the noncontact measuring device 13.

The region identification portion 111 distinguishes (separates or identifies) between a first region A1 corresponding to the window 1c (within the window frame) in the vehicle inside image Imi and a second region A2 other than the first region A1 (corresponding to the outside of the window frame) in the vehicle inside image Imi by performing the image processing on the vehicle inside image Imi, as an example. Specifically, the region identification portion 111 may distinguish between the first region A1 and the second region A2 by performing the image processing based on a difference in a luminance value (brightness) of a pixel, a color, or an existence of movement, for example. In addition, the position of the window frame 1a (a boundary between the first region A1 and the second region A2) acquired beforehand or the position of the window frame 1a which is identified at a previous calculation timing is stored at the memory portion such as the SSD 11d, for example, so that the boundary between the first region A1 and the second region A2 may be effectively detected in the vicinity of the position of the window frame 1a, i.e., the first region A1 and the second region A2 may be distinguished from each other. In a case where an object such as a passenger and luggage, for example, overlaps the window, a region excluding the aforementioned object serves as the first region A1.

The object detection portion 112 detects the object B at the vehicle exterior (vehicle or human body, for example) by performing the image processing on the vehicle outside image Imo (for example, the vehicle outside image Imo generated at the vehicle outside image generation portion 110), as an example. In a case of detecting the object B, a pattern matching and the like may be used. In addition, the object detection portion 112 may detect the object B at the vehicle exterior from data obtained from the noncontact measuring device 13 and may detect the object B at the vehicle exterior from the result of the image processing of the vehicle outside image Imo and data obtained from the noncontact measuring device 13. Further, the object detection portion 112 may acquire the distance from the vehicle 1 to the object B from the result of the image processing of the vehicle outside image Imo or the data obtained from the noncontact measuring device 13.

The object position determination portion 113 detects an object such as a human body and luggage, for example, included in the vehicle inside image Imi and determines (decides) whether the aforementioned detected object is positioned at the inside of the vehicle or the outside of the vehicle by performing the image processing on the vehicle inside image Imi, as an example. For example, in a case where the position of the window frame 1a is stored at the memory portion, the object position determination portion 113 may determine that the detected object is positioned at the outside of the vehicle when the image of the detected object only exists within the window frame 1a. On the other hand, in a case where the image of the detected object exists by crossing the window frame 1a, the object position determination portion 113 may determine that the detected object is positioned at the inside of the vehicle. Then, in a case where the object position determination portion 113 determines that the detected object is positioned at the outside of the vehicle, the region identification portion 111 specifies a region where the image of the object at the outside of the vehicle exists as the first region A1. In a case where the detected object is determined as being positioned at the inside of the vehicle, the region identification portion 111 specifies a region where the image of the object at the inside of the vehicle exists as the second region A2.

The image generation portion 114, as an example, generates the output image Im including the composite image Ims (outside frame image) and the vehicle outside image Imo (inside frame image) at the first region A1 for at least the display range Ad displayed at the display device 10, the composite image Ims (outside frame image) where the vehicle inside image Imi at the second region A2 and the vehicle outside image Imo adjusted in position relative to the aforementioned vehicle inside image Imi so as to conform to the second region A2 are superimposed on each other with the specified transmission rate $\alpha$ (ratio).

The vehicle position acquisition portion 115 may acquire the position of the vehicle 1 based on data from the GPS 16, the detection result of the noncontact measuring device 13, a wheel speed detected by the wheel speed sensor 17, a steering angle detected by the steering angle sensors 14, 15a, the image processing result of the vehicle outside image Imo acquired by the imaging portions 12 and the like, as an example.

The ratio change portion 116 may change the transmission rate $\alpha$ based on the detection results, signals and data acquired from the noncontact measuring device 13, the steering angle sensors 14, 15a, the GPS 16, the wheel speed sensor 17, the brake sensor 18a, the accelerator sensor 19, the torque sensor 20a, the shift sensor 21, the direction indicator 22 and the like, the instruction signals of the operation input portion 24b and the like, the detection result of the object detection portion 112, the position of the vehicle 1 acquired by the vehicle position acquisition portion 115 and the like, as an example.

The display range decision portion 117 may change the display range Ad based on the detection results, signals and data acquired from the noncontact measuring device 13, the steering angle sensors 14, 15a, the GPS 16, the wheel speed sensor 17, the brake sensor 18a, the accelerator sensor 19, the torque sensor 20a, the shift sensor 21, the direction indicator 22 and the like, the instruction signals of the operation input portion 24b and the like, the detection result of the object detection portion 112, the position of the vehicle 1 acquired by the vehicle position acquisition portion 115 and the like, as an example.

The additional image generation portion 118 may add an additional image Ima (for example, an artificial image such as a highlight (for example, a frame and the like) of the object detected by the object detection portion 112 and a display of a lane, a line of a parking frame and the like (for example, a line and the like) to the output image Im, as an example.

Figure 12:
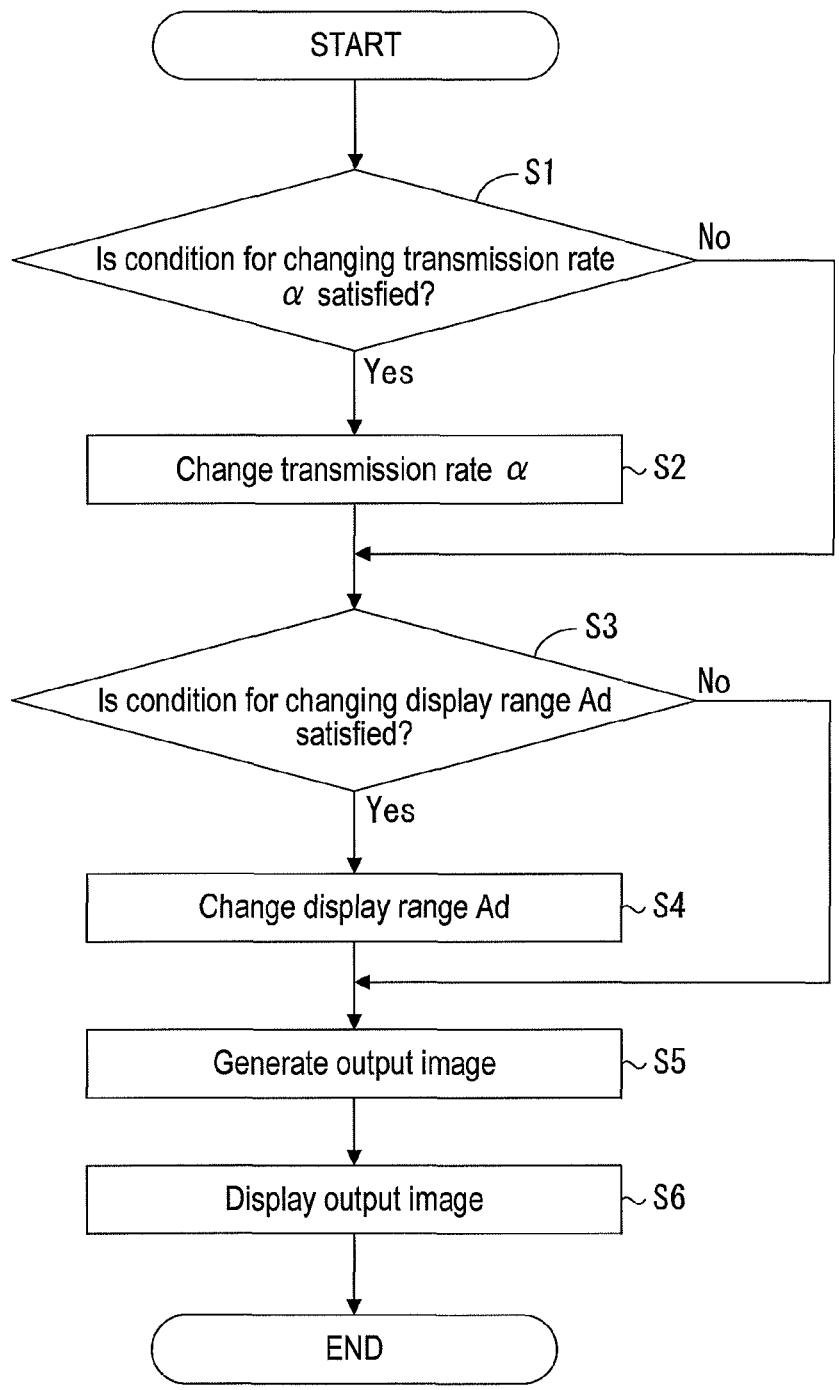
FIG. 12 is a flowchart showing an example of an operating procedure of the image display system according to the embodiment.

The image display system 100 according to the present embodiment may perform, as an example, a processing by procedures illustrated in FIG. 12. First, the ECU 11 acquires the detection results, signals and data acquired from the noncontact measuring device 13, the steering angle sensors 14, 15a, the GPS 16, the wheel speed sensor 17, the brake sensor 18a, the accelerator sensor 19, the torque sensor 20a, the shift sensor 21, the direction indicator 22 and the like, the instruction signals of the operation input portion 24b and the like, the detection result of the object detection portion 112 and the like so as to compare the acquired results, signals, data and the like with reference values and determines whether or not a condition for changing the transmission rate α is satisfied (step S1). In a case where the condition for changing the transmission rate α is satisfied, the ECU 11 functions as the ratio change portion 116 and changes the transmission rate α based on the aforementioned condition (step S2). An example of step S2 is explained later. Next, the ECU 11 acquires the detection results, signals and data acquired from the noncontact measuring device 13, the steering angle sensors 14, 15a, the GPS 16, the wheel speed sensor 17, the brake sensor 18a, the accelerator sensor 19, the torque sensor 20a, the shift sensor 21, the direction indicator 22 and the like, the instruction signals of the operation input portion 24b and the like, the detection result of the object detection portion 112, the position of the vehicle 1 acquired by the vehicle position acquisition portion 115, and the like so as to compare the acquired results, signals, data and the like with reference values and determines whether or not a condition for changing the display range Ad is satisfied (step S3). In a case where the condition for changing the display range Ad is satisfied, the ECU 11 functions as the display range decision portion 117 and changes the position or the size of the display range Ad based on the aforementioned condition (step S4). Then, the ECU 11 functions as the vehicle outside image generation portion 110, the region identification portion 111, the object detection portion 112, the object position determination portion 113 and the like and functions as the image generation portion 114 to generate the output image Im conforming to the specified transmission rate α and display range Ad (step S5). In step S5, the output image Im including the additional image may be generated. The display control portion 11e controls the display device 10 so that the generated output image Im is displayed (step S6).

Figure 13:
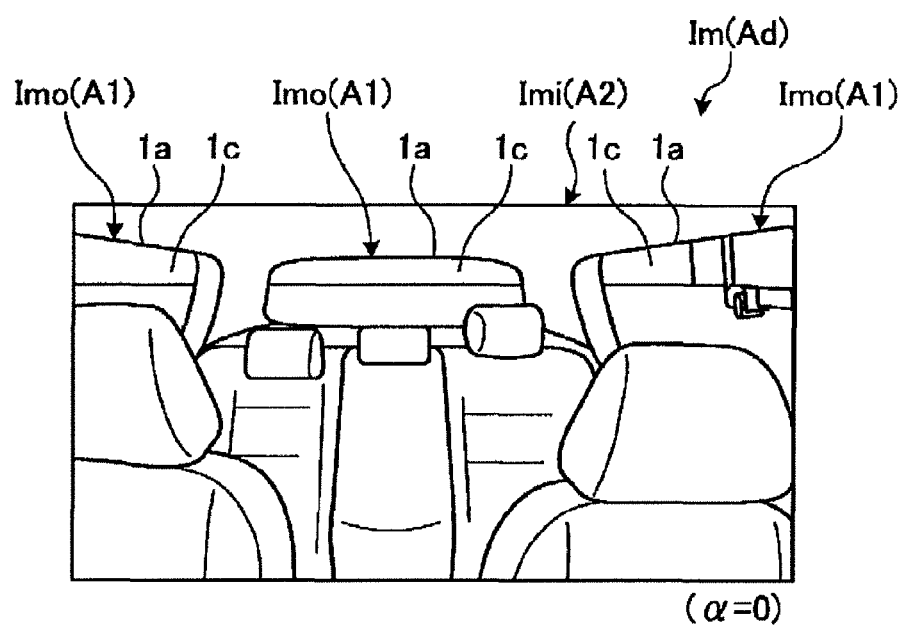
FIG. 13 is an example of the image (output image) displayed at the display device of the image display system according to the embodiment and is a diagram in a state before a lane change is performed.
Figure 14:
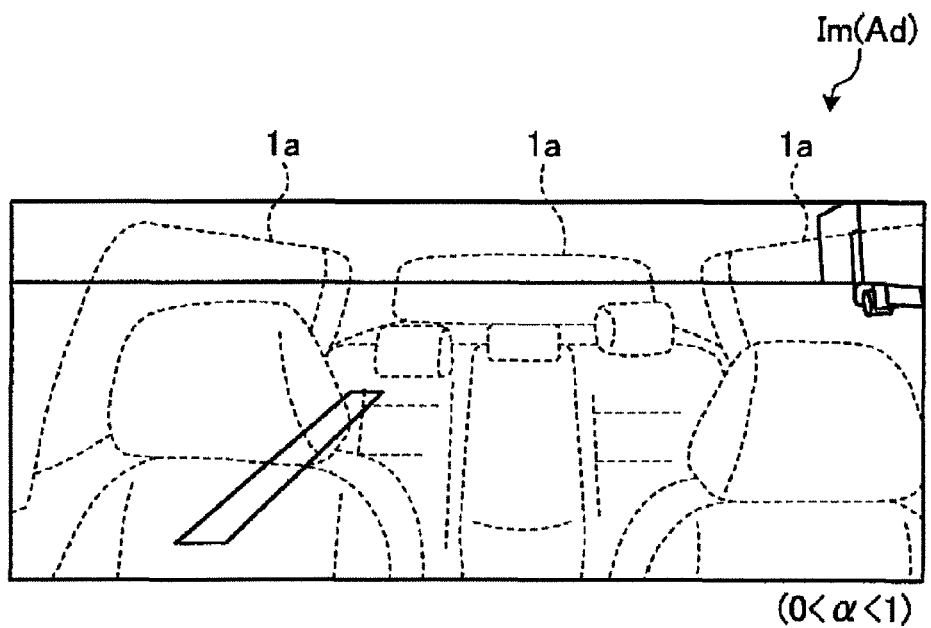
FIG. 14 is the example of the image (output image) displayed at the display device of the image display system according to the embodiment and is a diagram in a state where the lane change is performed.
Figure 15:
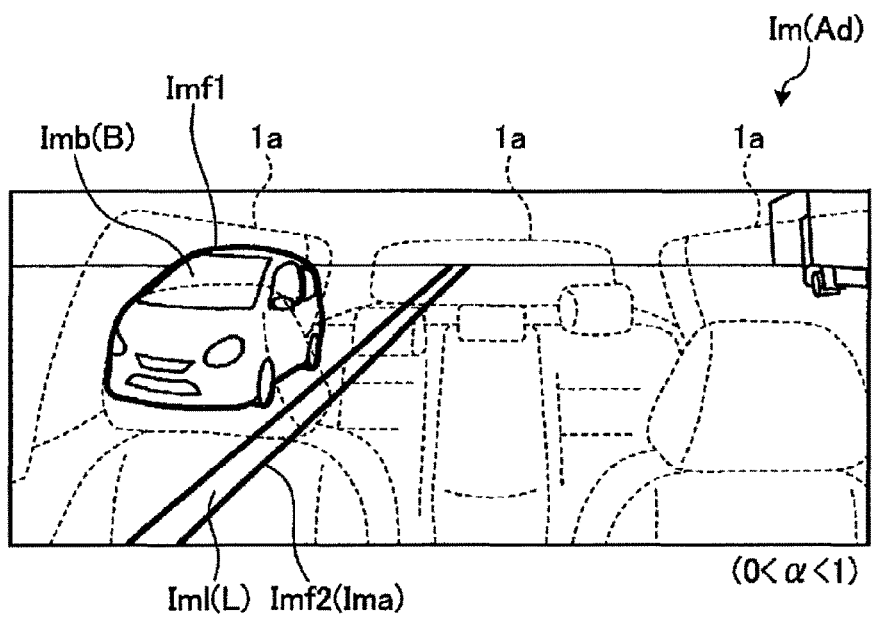
FIG. 15 is the example of the image (output image) displayed at the display device of the image display system according to the embodiment and is a diagram in a case where an object is detected at an outside of the vehicle in the state where the lane change is performed.

Each of FIGS. 13 and 14 illustrates, as an example, the output image Im (image displayed at the display device 10) in a case where the vehicle 1 changes lane to a left lane. In FIG. 13, the vehicle 1 is in a state travelling in a straight line. In this state, in the output image Im, the display range Ad is narrow and facing substantially straight rearward and the transmission rate α is 0 (zero). The ratio change portion 116 and the display range decision portion 117 acquire the detection results, signals and data obtained by each portion when the vehicle 1 makes a lane change so as to change the transmission rate α and the display range Ad in a case where the aforementioned detection results, signals and data satisfy predetermined conditions. In FIG. 14, in a case where a signal (signal obtained in association with a driving operation of the driver) from the direction indicator 22 instructing a movement in a leftward direction or a value (for example, the steering angle of each of the wheels 2, the position of the vehicle 1, the speed of the vehicle 1 and the like) of each portion (for example, the steering angle sensors 14, 15a, the wheel speed sensor 17, the torque sensor 20a and the like) related to the lane change of the vehicle 1 is obtained, for example, the display range decision portion 117 expands the display range Ad of the output image Im laterally (left-right direction) and slides (moves) the display range Ad in a direction of the lane to which the vehicle moves (to a left side). Thus, in the present embodiment, as an example, the driver may easily grasp the surroundings of the vehicle 1 and the state outside the vehicle in a travelling direction. Further, in FIG. 14, the ratio change portion 116 increases the transmission rate α at the second region A2 to the extent of 0.6, for example. Thus, according to the present embodiment, as an example, the driver may further easily grasp the surroundings of the vehicle 1 and the state of the outside of the vehicle in the travelling direction because structures such as a pillar, a roof, a seat and a trim, for example, of the vehicle 1 are transparent. In addition, as illustrated in FIG. 15, in a case where the object B (vehicle) approaching within a predetermined distance at a rear left side of the vehicle 1 is detected by the object detection portion 112, as an example, the display range decision portion 117 may determine the display range Ad so as to include the image Imb of the aforementioned object B. In FIG. 15, the ratio change portion 116 may specify the transmission rate α to be higher than a case where the object B is not detected, as an example. Accordingly, the driver may easily visually recognize the object B and easily grasp the distance and relative position of the object B from the vehicle 1, for example. Further, in FIG. 15, as an example, the additional image generation portion 118 adds a highlight display Imf1 in a frame shape surrounding the image Imb of the detected object B to the image Imb and adds a highlight display Imf2 in a band shape overlapping an image Im1 of a lane L of the road surface to the image Im1. Accordingly, in the present embodiment, as an example, the driver may further easily grasp the surroundings of the vehicle 1, the state of the outside of the vehicle in the travelling direction, the object B and the like. The aforementioned control may be performed in the same manner in a case where the vehicle changes lane in an opposite direction (right direction).

Figure 16:
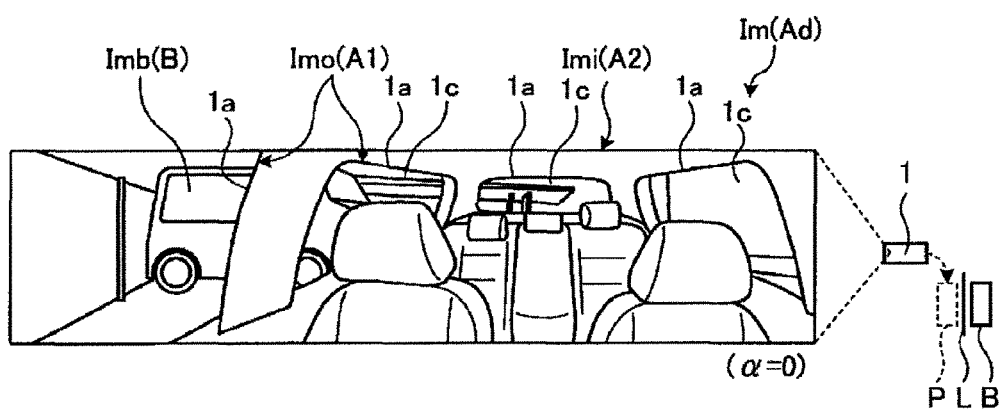
FIG. 16 is a schematic view illustrating a position of the vehicle at a time of parking and an example of the image (output image) displayed at the display device of the image display system at the aforementioned position, and is a diagram before the parking is started.
Figure 17:
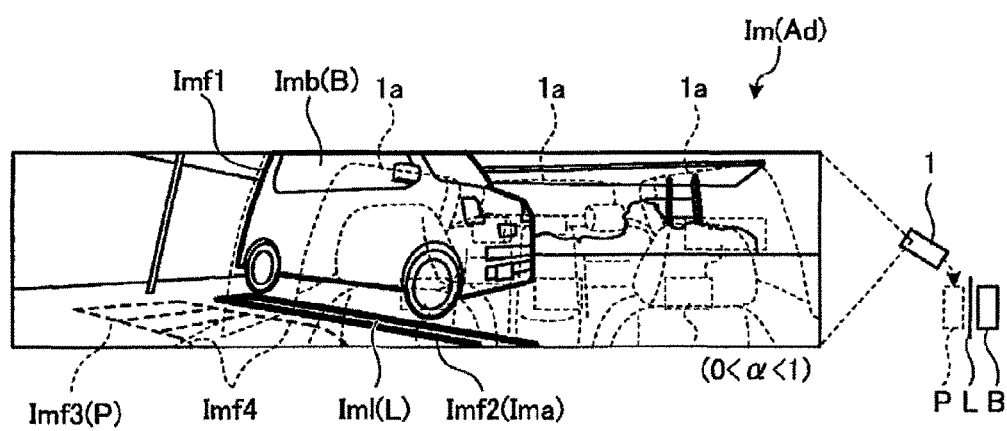
FIG. 17 is a schematic view illustrating the position of the vehicle at the time of parking and the example of the image (output image) displayed at the display device of the image display system at the aforementioned position, and is a diagram in a state before the vehicle reaches a target parking position.

FIGS. 16 to 18 each illustrate, as an example, the output image Im (image displayed at the display device 10) in a case where the vehicle 1 is parked by travelling rearward to a target parking position P while turning to the left side (so-called a garage parking). In FIG. 16, the vehicle 1 is in a state of traveling in a straight line. In this state, in the output image Im, the display range Ad is narrow and facing substantially straight rearward and the transmission rate cc is 0 (zero). The ratio change portion 116 and the display range decision portion 117 acquire the detection results, signals and data obtained by each portion at the time of parking operation of the vehicle 1 so as to change the transmission rate α and the display range Ad in a case where the aforementioned detection results, signals and data satisfy predetermined conditions. In FIG. 17, for example, in a case where a signal from the shift sensor 21 indicating that a reverse (backward) mode is selected (signal obtained in association with the driving operation of the driver) or a value (for example, the steering angle of each of the wheels 2, the position of the vehicle 1, the speed of the vehicle 1 and the like) of each portion (for example, the steering angle sensors 14, 15a, the wheel speed sensor 17, the torque sensor 20a and the like) related to the reverse traveling of the vehicle 1 at or below a predetermined speed while the vehicle 1 is turning is obtained, the display range decision portion 117 expands the display range Ad of the output image Im laterally (left-right direction) and slides (moves) the display range Ad in the turning direction (left side). Thus, in the present embodiment, as an example, the driver may easily grasp the surroundings of the vehicle 1 and the state outside the vehicle in the travelling direction. Further, in FIG. 17, the ratio change portion 116 increases the transmission rate α at the second region A2 to the extent of 0.6, for example. Thus, according to the present embodiment, as an example, the driver may further easily grasp the surroundings of the vehicle 1 and the state of the outside of the vehicle in the travelling direction because structures such as a pillar, a roof, a seat and a trim, for example, of the vehicle 1 are transparent. In FIG. 17, as an example, the additional image generation portion 118 adds the highlight display Imf1 in a frame shape surrounding the image Imb of the detected object B to the image Imb, adds the highlight display Imf2 in a band shape overlapping the image Im1 of a frame line L of the road surface to the image Im1, adds an image Imf3 indicating the target parking position P, and further adds an image Imf4 in a line shape indicating a moving path which is expected from the target parking position P or the steering angle, for example. Thus, according to the present embodiment, as an example, the driver may easily grasp the surroundings of the vehicle 1, the state of the outside of the vehicle in the travelling direction, the target parking position P, the future moving path and the like. Further, in FIG. 18, the vehicle 1 is in a state approaching the target parking position P. In this state, the ratio change portion 116 further increases the transmission rate α at the second region A2 to 1, for example. Thus, in the present embodiment, as an example, the driver may further easily visually recognize the image Imb of the surrounding object B (obstacle, vehicle, human body and the like) because structures such as a pillar, a roof, a seat and a trim, for example, of the vehicle 1 are completely transparent and may easily grasp the distance and relative position between the vehicle 1 and the obstacle (object B) in the surroundings of the vehicle 1 or the target parking position P. In addition, as an example, because the imaging is conducted so that a portion of the vehicle body of the vehicle 1 (bumper in the example of FIG. 18) is included in the vehicle outside image Imo, the driver may further easily grasp the distance and relative positional relationship between the vehicle 1 and the obstacle (object B) in the surroundings of the vehicle 1 or the target parking position P even when the transmission rate α becomes 1. The aforementioned control may be performed in the same manner in a case where the vehicle is parked while turning in an opposite direction (right direction).

In the present embodiment, as an example, in a case where the object position determination portion 113 determines that the image Imb of the object B different from the structures of the vehicle 1 (vehicle body) (human body, luggage, goods and the like) is included in the vehicle inside image Imi, the image generation portion 114 may delete the image Imb of the aforementioned object B from the output image Im. In this case, whether or not the image Imb of the object B is deleted and which image Imb of the object B among the plural objects B is deleted, for example, may be arbitrary specified. In addition, the image generation portion 114 may fill a region where the image Imb of the object B is deleted in the vehicle inside image Imi with the vehicle inside image Imb (initial image) which is obtained in a state where the object B is not present at the vehicle interior. The vehicle inside image Imb in a state where the object B is not present at the vehicle interior is stored beforehand at the memory portion such as the SSD 11*d*, for example. Accordingly, in a case where the image Imb of the object B at the vehicle interior is deleted, as an example, the region within the window frame 1*a*, i.e., the region where the vehicle outside image Imo is displayed is expanded as compared to the output image Im including the image Imb of the object B at the vehicle interior, which may increase visibility. The object position determination portion 113 utilizes a detection result of a sensor (as an example, infrared sensor or the like, not illustrated) detecting the object B itself provided at the vehicle interior to thereby enhance accuracy of determination of the object B.

As explained above, according to the present embodiment, as an example, the image generation portion 114 in the image display system 100 (image display apparatus) generates the output image Im (image) including the vehicle outside image Imo at the first region A1 and the composite image Ims at the second region A2 at least for the display range Ad displayed at the display device 10. The composite image Ims at the second region A2 is the image where the vehicle inside image Imi and the vehicle outside image Imo which is adjusted in position relative to the aforementioned vehicle inside image Imi so as to conform to the second region A2 are superimposed on each other with the specified transmission rate α (ratio). The display range decision portion 117 may change the display range Ad. The ratio change portion 116 may change the transmission rate α (ratio). That is, according to the present embodiment, as a display mode of the output image Im including the image where the vehicle inside image Imi and the vehicle outside image Imo are superimposed on each other with the transmission rate α at the second region A2, at least one of the display range Ad and the transmission rate α is changeable, as an example. How to change the display range Ad (moving amount, moving direction, expansion, reduction and the like) and how to change the transmission rate α (change amount, value and the like) may be variously specified.

In the present embodiment, as an example, the display range decision portion 117 may change the display range Ad and the ratio change portion 116 may change the transmission rate α based on the signal obtained by the driving operation of the vehicle 1. Thus, as an example, the display mode (the display range Ad or the transmission rate α of the output image Im) may be changed depending on the driving operation. Thus, as an example, the driver may easily or securely perform the driving operation. The signal obtained in association with the driving operation of the driver may be a signal obtained in association with an operation relative to an operation portion performing the driving operation, for example, a steering wheel, a shift switch, a brake pedal, a clutch pedal, and an accelerator pedal other than the aforementioned direction indicator 22 and the shift lever. Changes of the display mode for the operation of the operation portion may be variously specified. For example, the transmission rate α may increase or the display range Ad may expand depending on the operation of the brake pedal.

In the present embodiment, as an example, the display range decision portion 117 may change the display range Ad and the ratio change portion 116 may change the transmission rate α based on the steering angle detected by the steering angle sensors 14, 15*a* (steering angle detection portion). Thus, as an example, the display mode (the display range Ad or the transmission rate α) of the output image Im depending on the steering angle may be easily obtained. Thus, as an example, the driver may easily or securely perform the driving operation.

In the present embodiment, as an example, the display range decision portion 117 may change the display range Ad and the ratio change portion 116 may change the transmission rate α based on the position of the vehicle 1 acquired by the vehicle position acquisition portion 115. Thus, as an example, the display mode (the display range Ad or the transmission rate α) of the output image Im depending on the position of the vehicle 1 may be easily obtained. Thus, as an example, the driver may easily or securely perform the driving operation.

In the present embodiment, as an example, the display range decision portion 117 may change the display range Ad and the ratio change portion 116 may change the transmission rate α based on the position of the object B detected by the object detection portion 112. Thus, as an example, the display mode (the display range Ad or the transmission rate α) of the output image Im depending on the position of the object B may be easily obtained. Thus, as an example, the driver may easily or securely perform the driving operation.

In the present embodiment, as an example, the object position determination portion 113 is provided to determine whether the object B identified as the image within the window frame 1a in the vehicle inside image Imi is positioned at the vehicle interior or the vehicle exterior. The region identification portion 111 causes the image Imb within the window frame 1a of the object B which is determined as being positioned at the vehicle interior by the object position determination portion 113 to be included in the second region A2 and causes the image Imb of the object B which is determined as being positioned at the vehicle exterior by the object position determination portion 113 to be included in the first region A1. Thus, according to the present embodiment, as an example, the output image Im (image) may be accurately displayed.

The object position determination portion 113 may determine whether the object B that overlaps the window frame 1a is positioned at the vehicle interior or the vehicle exterior in each alternative example as below different from the aforementioned embodiment.

<First Alternative Example> (Light Irradiation)

Figure 19:
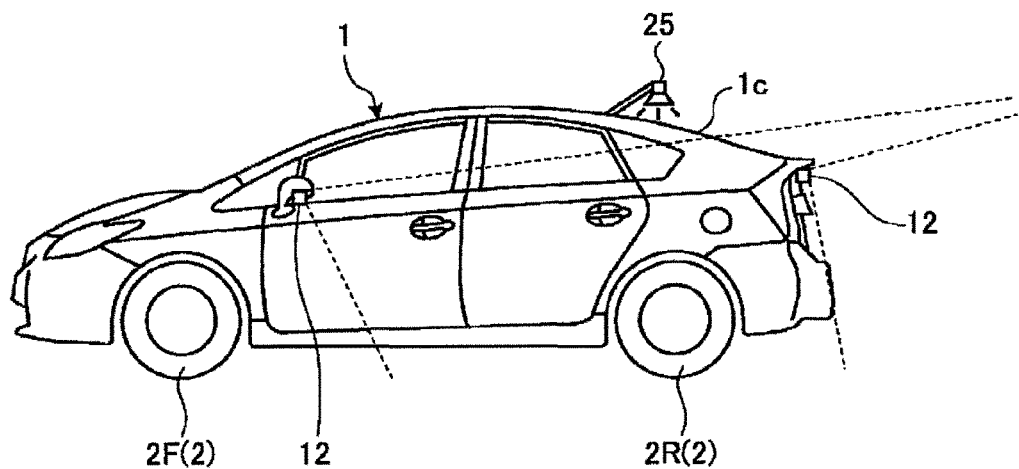
FIG. 19 is a side view of a vehicle to which an image display system according to an alternative example is employed.

In the present alternative example, as illustrated in FIG. 19, the vehicle 1 is provided with a light-emitting portion 25 (light) irradiating light towards the window 1c from the outside of the vehicle. Accordingly, the first region A1 (see FIG. 2) corresponding to the region of the window 1c within the vehicle inside image Imi becomes white (state of overexposure) regardless of presence of the object at the vehicle exterior. Thus, the object position determination portion 113 is restrained from wrongly recognizing the object at the vehicle exterior as the object at the vehicle interior. The light-emitting portion 25 is provided, as an example, at a position not captured by the imaging portion 12 (position at which the light-emitting portion 25 is hidden by the vehicle body and is not captured in the image). The light-emitting portion 25 may be configured to be foldable (movable between a position along the vehicle body and a position projecting from the vehicle body).

<Second Alternative Example> (Switching of Exposure)

In the present alternative example, the imaging portion 12I (12) capturing the vehicle inside image Imi is configured so that an exposure setting is switchable. The region of the window 1c (within the window frame 1a) in the vehicle inside image Imi is thus specified in overexposure. In this case, the first region A1 corresponding to the region of the window 1c within the vehicle inside image Imi also becomes white (state of overexposure) regardless of presence of the object at the vehicle exterior. Thus, the object position determination portion 113 is restrained from wrongly recognizing the object at the vehicle exterior as the object at the vehicle interior. The object position determination portion 113 may perform the aforementioned processing at intervals (for example, at constant frame intervals specified beforehand). In this case, change of circumstances may be addressed as needed, which may increase accuracy of determination. The similar result (effect) may be obtained by adjustments of brightness and contrast by the image processing of the ECU 11.

<Third Alternative Example> (Usage of Marker)

Figure 20:
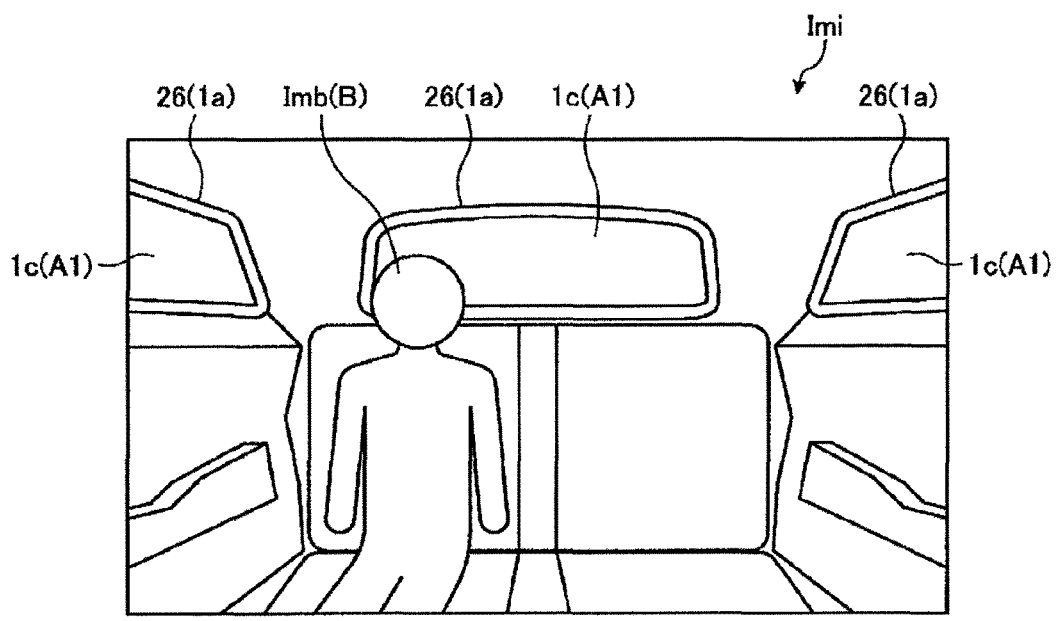
FIG. 20 is a schematic view illustrating an example of a structure at an inside of a vehicle to which an image display system according to an alternative example is employed.

In the present alternative example, as illustrated in FIG. 20, a marker 26 is provided at a boundary portion (edge of the window frame 1a or the window 1c) between the window 1c and a vehicle inside structure. The object position determination portion 113 may determine the object B crossing the marker 26 in the image Imb is positioned at the vehicle interior. The marker 26 may be a luminescent substance, fluorophore, a mirror surface member and the like, for example. The marker 26 may be in a form (brightness, color, and the like) easily distinguished from others (surroundings) in the vehicle inside image Imi. In addition, the marker 26 may be a molding of the window 1c, for example.

<Fourth Alternative Example> (Detection of Skeleton)

In the present alternative example, the object position determination portion 113 utilizes a skeleton pattern of a human body for the detection of the image Imb of the object B. The object position determination portion 113 performs a skeleton detection for the vehicle inside image Imi to thereby identify the image corresponding to a human shape from the vehicle inside image Imi. The object position determination portion 113 may utilize a fact that the human body moves to thereby distinguish between the image Imb of the object B that moves over time and the image of the structure of the vehicle 1.

<Fifth Alternative Example> (Pattern Matching)

In the present alternative example, the object position determination portion 113 may identify the image of a human face by a pattern matching with a human body for the vehicle inside image Imi. Further, the object position determination portion 113 may also determine whether the object B which overlaps the window 1c is positioned at the vehicle interior or the vehicle exterior based on whether or not the image of the human body (from the neck down) connecting the aforementioned identified human face is present.

The examples of the embodiment of the present invention have been explained in the above, however, the aforementioned embodiment and alternative examples are proposed as examples and not intended to limit the scope of the invention. The above embodiment and alternative examples may be performed in other various modes. Without departing from the spirit of the invention, various omissions, replacements, combinations and changes may be made. The constructions or shapes of each embodiment are partially switchable to be performed. Specifications (configuration, type, direction, shape, size, length, width, thickness, height, quantity, layout, position, material and the like) of each construction and shape, for example, may be appropriately changed to be performed.

EXPLANATION OF REFERENCE NUMERALS

1: vehicle, 1c: window, 10: display device, 11: ECU (image display control apparatus), 11e: display control portion, 12: imaging portion (second imaging portion), 12I (12): imaging portion (first imaging portion), 14, 15a: steering sensor (steering angle detection portion), 100: image display system, 111: region identification portion, 112: object detection portion, 113: object position determination portion, 114: image generation portion, 115: vehicle position acquisition portion, 116: ratio change portion, 117: display range decision portion, A1: first region, A2: second region, Ad: display range, B: object, Imi: vehicle inside image, Imo: vehicle outside image, Ims: composite image, Im: output image (image).

The invention claimed is:
1. An image display control apparatus comprising:
a region identification portion distinguishing between a first region corresponding to a window in a vehicle inside image and a second region in the vehicle inside image excluding the first region;
an image generation portion generating a composite image where a vehicle outside image is superimposed on the vehicle inside image at the second region with a specified ratio at least for a display range displayed at a display device;
a display range decision portion that determines the display range;
a display control portion controlling the display device so that the image generated by the image generation portion is displayed at the display range which is decided by the display range decision portion;
a ratio change portion changing the ratio; and
an object position determination portion determining whether an object identified as an image within a window frame in the vehicle inside image is positioned at an inside of the vehicle or an outside of the vehicle wherein
the ratio change portion changes the ratio in accordance with a position of a mobile object detected by an object detection portion that detects the mobile object at the vehicle exterior,
the ratio represents a transmission rate,
the composite image in the second region passes through a vehicle object within the vehicle inside image,
the vehicle object being a human body or luggage,
the ratio change portion increases a transmission rate of the image,
the region identification portion causes the image of the object within the frame of the vehicle window which has been determined by the object position determination portion as being positioned at the inside of the vehicle to be included in the second region, and
the region identification portion causes the image of the object which has been determined by the object position determination portion as being positioned at the outside of the vehicle to be included in the first region.
2. The image display control apparatus according to claim 1, wherein the display range decision portion changes the display range based on a signal obtained by a driving operation of a vehicle.
3. The image display control apparatus according to claim 1, wherein the display range decision portion changes the display range depending on a steering angle detected by a steering angle detection portion that detects the steering angle.
4. The image display control apparatus according to claim 1, wherein the display range decision portion changes the display range depending on a vehicle position acquired by a vehicle position acquisition portion that acquires the vehicle position.
5. The image display control apparatus according to claim 1, wherein the display range decision portion changes the display range depending on a position of the mobile object detected by the mobile object detection portion that detects the mobile object at a vehicle exterior.
6. The image display control apparatus according to claim 1, wherein the ratio change portion changes the ratio based on a signal obtained by a driving operation of a vehicle.
7. The image display control apparatus according to claim 1, wherein the ratio change portion changes the ratio depending on a steering angle detected by a steering angle detection portion that detects the steering angle.
8. The image display control apparatus according to claim 1, wherein the ratio change portion changes the ratio depending on a vehicle position acquired by a vehicle position acquisition portion that acquires the vehicle position.
9. The image display control apparatus according to claim 1 comprising:
an image generation portion generating an image at least for a display range displayed at a display device, the image including a composite image where the vehicle inside image at the second region and a vehicle outside image conforming to the second region are superimposed on each other with a specified ratio and a vehicle outside image at the first region.
10. The image display control apparatus according to claim 1 wherein
the vehicle inside image is imaged by a first imaging portion, and
the vehicle outside image is imaged by the second imaging portion.
11. The image display control apparatus according to claim 1, wherein
the ratio changing portion changes the transmission rate in accordance with a vehicle position acquired by a vehicle position acquisition portion that acquires the vehicle position.
12. The image display control apparatus according to claim 1, wherein
in response to the transmission rate being satisfied, the transmission rate is changed, and
in response to the display range being satisfied, the display range is changed.
13. An image display system comprising:
an image display control apparatus including:
a region identification portion distinguishing between a first region corresponding to a window in a vehicle inside image and a second region in the vehicle inside image excluding the first region;
an image generation portion generating a composite image where a vehicle outside image is superimposed on the vehicle inside image at the second region with a specified ratio at least for a display range displayed at a display device;
a display range decision portion that determines the display range;
a display control portion controlling the display device so that the image generated by the image generation portion is displayed at the display range which is decided by the display range decision portion;
a display device controlled by the image display control apparatus;
a first imaging portion imaging a vehicle inside image;
a second imaging portion imaging a vehicle outside image; and
an object position determination portion determining whether an object identified as an image within a window frame in the vehicle inside image is positioned at an inside of the vehicle or an outside of the vehicle, wherein the region identification portion causes the image of the object within the frame of the vehicle window which has been determined by the object position determination portion as being positioned at the inside of the vehicle to be included in the second region, the ratio represents a transmission rate, the composite image in the second region passes through a vehicle object within the vehicle inside image, the vehicle object being a human body or luggage, the ratio change portion increases a transmission rate of the image, and the region identification portion causes the image of the object which has been determined by the object position determination portion as being positioned at the outside of the vehicle to be included in the first region.

14. An image display control apparatus comprising:

a region identification portion distinguishing between a first region corresponding to a window in a vehicle inside image and a second region in the vehicle inside image excluding the first region;

an image generation portion generating a composite image where a vehicle outside image is superimposed on the vehicle inside image at the second region with a specified ratio at least for a display range displayed at a display device;

a display range decision portion that determines the display range;

a display control portion controlling the display device so that the image generated by the image generation portion is displayed at the display range which is decided by the display range decision portion; and an object position determination portion determining whether an object identified as an image within a window frame in the vehicle inside image is positioned at an inside of the vehicle or an outside of the vehicle, wherein the region identification portion causes the image of the object within the frame of the vehicle window which has been determined by the object position determination portion as being positioned at the inside of the vehicle to be included in the second region, the ratio represents a transmission rate, the composite image in the second region passes through a vehicle object within the vehicle inside image, the vehicle object being a human body or luggage, the ratio change portion increases a transmission rate of the image, and the region identification portion causes the image of the object which has been determined by the object position determination portion as being positioned at the outside of the vehicle to be included in the first region.

\* \* \* \* \*